(12) United States Patent  
Jahns et al.

(10) Patent No.: US 7,163,088 B2
(45) Date of Patent: Jan. 16, 2007

(54) LIFT TRUCK FOR THE TRANSPORT OF A BATTERY BLOCK OF AN INDUSTRIAL TRUCK

(75) Inventors: Claus-Peter Jahns, Hamburg (DE); Frank Rademacher, Hamburg (DE)

(73) Assignee: STILL GmbH, Hamburg (DE)

( * ) Notice: Subject to any disclaimer, the term of this patent is extended or adjusted under 35 U.S.C. 154(b) by 635 days.

(21) Appl. No.: 10/610,354

(22) Filed: Jun. 30, 2003

(65) Prior Publication Data

US 2004/0094379 A1    May 20, 2004

(30) Foreign Application Priority Data

Jul. 5, 2002    (DE)    ................................. 102 30 389

(51) Int. Cl.
*B66F 9/06*    (2006.01)
(52) U.S. Cl. .................. 187/222; 187/224; 187/233; 180/210; 180/211; 180/214; 701/22; 701/50
(58) Field of Classification Search ............ 280/47.37, 280/47.35, 47.34; 180/68.5, 23, 24, 210, 180/211, 223, 214; 414/486, 490, 491; 187/222, 187/224, 233; 701/22, 50
See application file for complete search history.

(56) References Cited

U.S. PATENT DOCUMENTS 2,592,091 A * 4/1952 Weaver ...................... 180/214
3,757,899 A * 9/1973 Smith, Jr. .................... 187/224
4,427,094 A * 1/1984 Winkelblech ............... 187/233
5,360,307 A * 11/1994 Schemm et al. ............ 414/343
5,653,569 A   8/1997 Sears
6,123,162 A * 9/2000 Rodriguez et al. ........... 180/8.3

FOREIGN PATENT DOCUMENTS

| DE | 33 39 890 A1 | 5/1985 |
| EP | 1 053 972 A2 | 11/2000 |
| EP | 1 095 831 A2 | 5/2001 |
| EP | 1 184 242 A2 | 3/2002 |
| JP | 10036090 A | 2/1998 |

* cited by examiner

*Primary Examiner*—Kathy Matecki
*Assistant Examiner*—Stefan Kruer
(74) *Attorney, Agent, or Firm*—The Webb Law Firm

(57) ABSTRACT

A lift truck (6) for the transport of a battery block (1) of an industrial truck, such as a fork-lift truck. The lift truck (6) includes at least one electrical unit. The electrical unit can be connected with the battery block (1) to be transported for supplying electrical energy to the lift truck (6). The lift truck (6) may not have its own battery. The electrical unit can be an electrical traction drive motor.

14 Claims, 2 Drawing Sheets

LIFT TRUCK FOR THE TRANSPORT OF A BATTERY BLOCK OF AN INDUSTRIAL TRUCK

CROSS-REFERENCE TO RELATED APPLICATION

This application corresponds to German Application No. 102 30 389.4, filed Jul. 5, 2002, which is herein incorporated by reference in its entirety.

BACKGROUND OF THE INVENTION

1. Field of the Invention

This invention relates to a lift truck for transporting of a battery block of an industrial truck, such as of a fork-lift truck, wherein the lift truck has at least one electrical unit.

2. Technical Considerations

Electrically propelled industrial trucks, e.g., electric fork-lift trucks, have a battery block that is equipped with storage batteries. The battery block can be removed from the industrial truck for the performance of charging operations or for maintenance purposes, for example. The known art describes industrial trucks that have a lateral opening through which the battery block can be removed horizontally from the industrial truck or inserted horizontally into the industrial truck. A lift truck is frequently used for removing, lifting, transporting, and inserting the battery block, such as to replace a used battery block and/or to insert a fresh battery block into the industrial truck. Such a lift truck can be, for example, a gallows lift truck or a fork-lift truck. These lift trucks are normally also electrically propelled and have at least one electrical unit for traction drive and/or the lift drive. The lift trucks of the known art are equipped with their own battery to supply power to the electrical unit lift truck.

An object of the invention is to provide a lift truck with a particularly simple construction for the transport of the battery blocks of industrial trucks.

SUMMARY OF THE INVENTION

The invention teaches that, to obtain its supply of electrical energy, the electrical unit of a lift truck can be connected with the battery block to be transported, e.g., to or from the industrial truck. The electrical units of the lift truck are, therefore, powered by the energy stored in the battery block that is being transported. When the transported battery block is fully charged, it is easily possible to supply the lift truck from this battery block. The same is true when a discharged battery block is removed from the industrial truck, because in the normal operation of an industrial truck, the battery block is considered discharged when it has a residual charge of approximately 20%. This is designed to protect the cells of the battery block. The lift truck uses only a small portion of this residual charge to travel the short distance between the industrial truck and a charging station.

In one particularly simple construction of the lift truck, the lift truck has no battery of its own. When a battery block is being transported, this battery block always supplies the electrical energy required by the electrical units of the lift truck. When there is no battery block on the lift truck, the lift truck can be moved manually by the operator. For this purpose, only a small amount of force is required, because a lift truck without a conventional battery block is not heavy, relatively, and can typically be moved by a worker.

In one exemplary embodiment of the invention, an electrical traction motor can be provided as the electrical unit of the lift truck. The construction of the lift truck is thereby similar to the construction of a manually operated fork-lift truck that also has an electrical traction motor. The lifting device of the lift truck can be actuated manually by the operator, e.g., by means of a manually operated hydraulic pump.

The manual displacement of the lift truck can be facilitated if the traction drive motor is connected with a drive wheel by means of a freewheel device. By means of the freewheel device, the drive wheel of the lift truck can be disconnected from the traction drive motor, so that the drive wheel does not rotate at the same time the lift truck is being displaced manually. For example, the freewheel device can be in the form of a clutch that can be disengaged manually or automatically or in the form of a conventional freewheel mechanism that transmits torque only in one direction of rotation.

In an expanded realization of the lift truck, the electrical unit can be an electrical lift drive motor. In this case, the battery block can also be lifted with the electrical energy stored in the battery block itself.

A hydraulic pump can be driven by the electrical lifting drive motor. In that case, a conventional hydraulic device can be used in the lift truck.

The electrical unit can be connected with the battery block by means of a battery plug connector. The same plug connections can be used for this purpose as those used to connect the battery block to the corresponding industrial truck. Alternatively, automatic devices can be used for the same purpose. For example, as it moves underneath the battery block that is located in the industrial truck, the lift truck can automatically interrupt the contact of the battery block with the industrial truck and simultaneously connect the battery block with the electrical units of the lift truck.

It is particularly advantageous if the electrical unit is designed so that it can be supplied with different electrical voltages, such as with voltages in the range of 24 Volts and 100 Volts. In that way, the same lift truck can be used to transport battery blocks of a wide range of different conventional industrial trucks, the operating voltages of which are generally in the range cited above.

An additional object of the invention is a system with a lift truck of the invention and with at least one industrial truck, in particular a fork-lift truck, which has a battery block that can be removed in the horizontal direction. In the system, the mechanical shapes of the industrial truck and of the lift truck are coordinated with one another so that it becomes particularly easy to lift and move the battery block located in the industrial truck by means of the lift truck and to electrically connect the battery block to the units of the lift truck.

BRIEF DESCRIPTION OF THE DRAWINGS

Additional advantages and details of the invention are explained in greater detail below with reference to the exemplary embodiment illustrated in the accompanying schematic figures, in which.

DESCRIPTION OF THE PREFERRED EMBODIMENT

Figure 1:
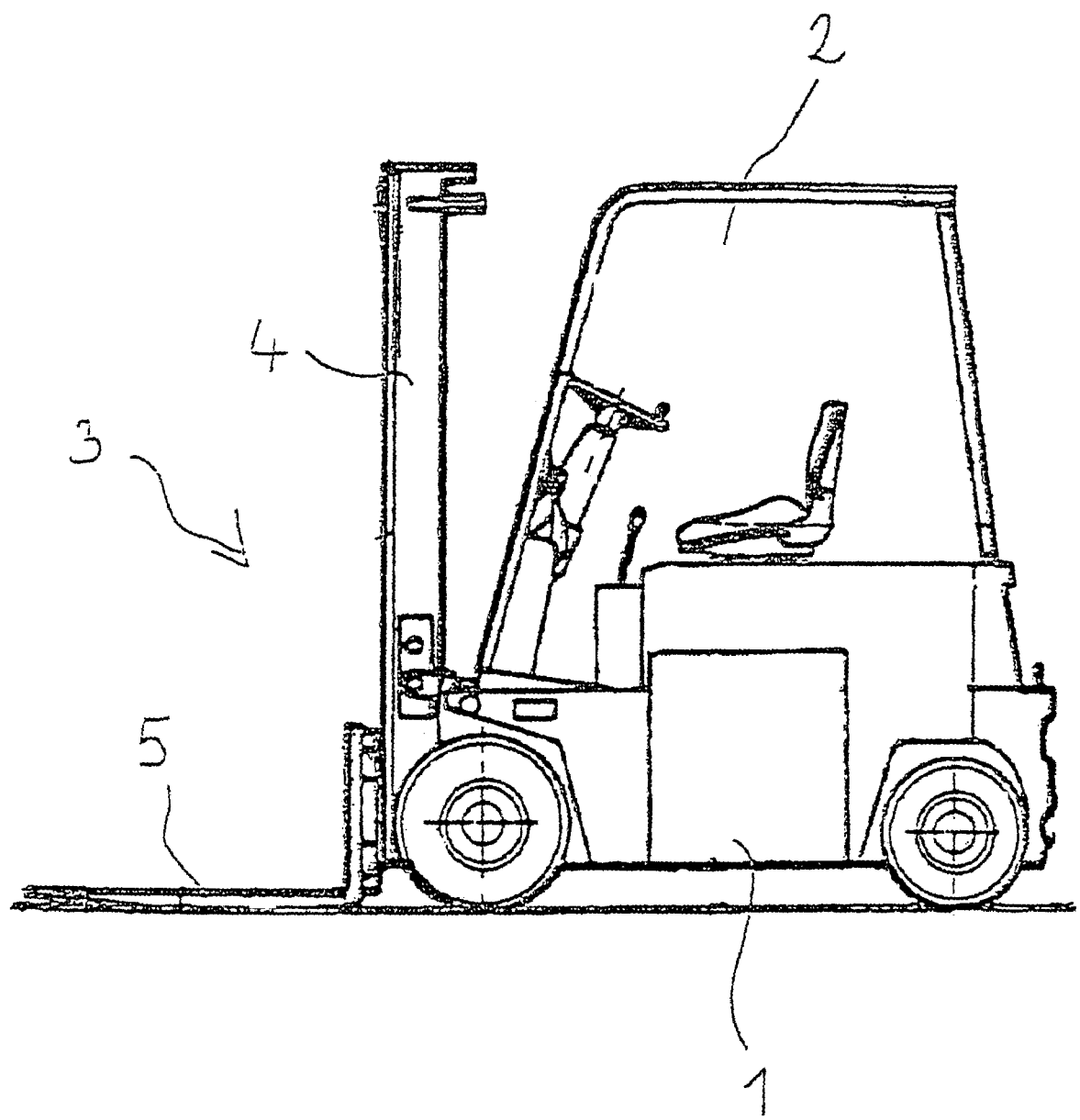
FIG. 1 shows a fork-lift truck (industrial truck) with a battery block that can be removed in the lateral direction.

FIG. 1 shows an exemplary industrial truck in the form of a fork-lift truck with a battery block 1. Above the battery block 1 there is a driver's cab 2 of the fork-lift truck, a load handling device 3 with a lifting frame 4, and a load fork 5 located on the front of the fork-lift truck. The battery block 1 can be removed laterally (i.e., in a sideways direction) from the fork-lift truck. For this purpose, the fork-lift truck has a frame that is partly open underneath the battery block 1. A manual lift truck (as described below) or an electrically operated low-lift or high-lift truck can be moved underneath the battery block 1 and the battery block 1 can then be lifted and removed from the fork-lift truck. This removal can be done when the battery block, which is normally equipped with lead storage batteries, is to be recharged outside the fork-lift truck. In this case, a battery block is conventionally considered to be discharged when it contains a residual charge of approximately 20%. As a result of which, the useful life of the battery block 1 is significantly increased compared to a regular recharging after it has been fully discharged. The recharged battery block is likewise inserted into the fork-lift truck by means of a lift truck, e.g., from the side and in the horizontal direction.

Figure 2:
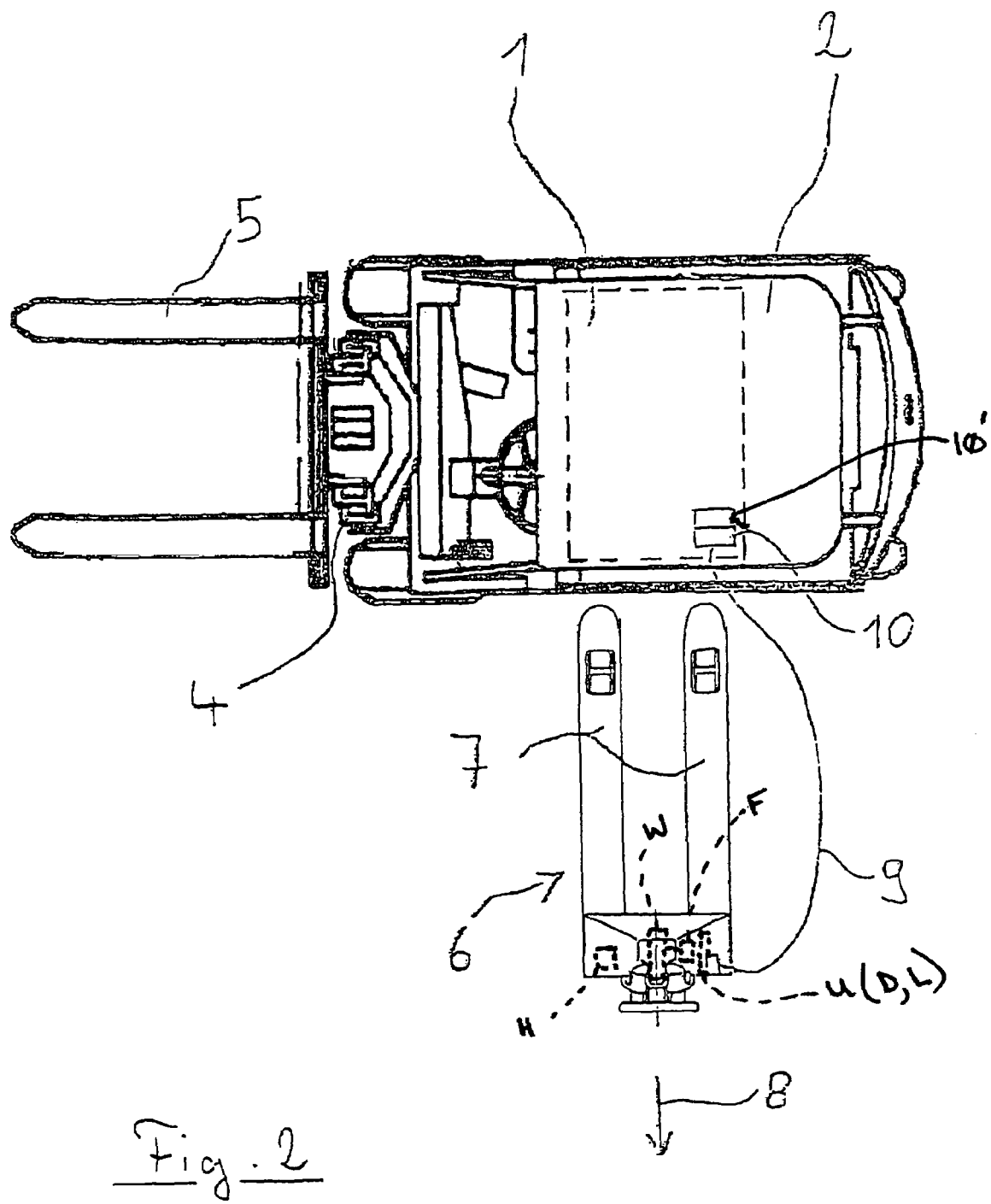
FIG. 2 is an overhead view of the fork-lift truck and a lift truck as claimed by the invention.

FIG. 2 is an overhead view of the fork-lift truck and a lift truck 6 of the invention for the transport of the battery block 1. The load arms 7 of the lift truck 6 can be pushed underneath the battery block 1. The load arms 7 can then be lifted together with the battery block 1 and the battery block 1 extracted from the fork-lift truck in the lateral direction 8.

The lift truck 6 can have at least one electrical unit U for example a conventional electrical traction drive motor D and/or a conventional electrical lifting motor L. The lifting motor L can be formed, for example, by an electrical pump motor or an electrical spindle drive. The invention teaches that the power supply of these electrical units can be provided by the industrial truck battery block 1 to be transported. For this purpose, the lift truck 6 can be connected with the battery block 1 by means of an electrical line 9 and a battery connector plug connection 10. The part of the plug connection 10' that belongs to the battery block 1 can also be used, e.g., during the operation of the fork-lift truck, to connect the fork-lift truck to the battery block 1.

The invention teaches that the lift truck 6 may not have its own battery, as a result of which the lift truck 6, when it is not carrying a load, is particularly lightweight and can, therefore, be moved manually by the application of only a relatively small amount of force. The drive wheel W of the lift truck can be connected with a freewheel device F so that it is not necessary to operate an electrical drive motor during the manual moving process. When an electrical lifting drive motor is provided, the load arms 7 can be raised only when there is a power supply, e.g., from the battery block 1 being transported. On the other hand, the load arms 7 can be lowered at any time. Alternatively or in addition to the electrical lift drive motor, a manual lift drive, for example a manually operated hydraulic pump H can be provided such that the load arms 7 can be raised without electrical power. The cost of the manufacture of the lift truck 6 is significantly less than the cost of a conventional lift truck that has its own battery. So that the lift truck 6 can be used to transport battery blocks of different fork-lift trucks, the electrical units of the lift truck 6 can be suitable for operation with different electrical input voltages.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A lift truck for the transport of a battery block of an industrial truck, the lift truck comprising:
    at least one electrical unit, wherein the electrical unit is connectable with the battery block to be transported to supply the lift truck with electrical energy,
    wherein the at least one electrical unit includes an electrical traction drive motor, and
    wherein the traction drive motor is connected with a drive wheel by a freewheel device.

2. The lift truck as claimed in claim 1, wherein the lift truck does not have its own battery.

3. The lift truck as claimed in claim 1, wherein the at least one electrical unit includes an electrical lift drive motor.

4. The lift truck as claimed in claim 3, including a hydraulic pump driven by the electrical lift drive motor.

5. The lift truck as claimed in claim 1, wherein the electrical unit is connectable to the battery block by a battery connector plug.

6. The lift truck as claimed in claim 1, wherein the electrical unit is configured so that it can be supplied with different electrical voltages.

7. A system including a lift truck as claimed in claim 1 and further including at least one industrial truck having a battery block removable in a horizontal direction.

8. The lift truck as claimed in claim 2, wherein the at least one electrical unit includes an electrical lift drive motor.

9. The lift truck as claimed in claim 8, including a hydraulic pump driven by the electrical lift drive motor.

10. The lift truck as claimed in claim 2, wherein the electrical unit is connectable to the battery block by a battery connector plug.

11. The lift truck as claimed in claim 3, wherein the electrical unit is connectable to the battery block by a battery connector plug.

12. The lift truck as claimed in claim 6, wherein the electrical unit is configured to be supplied with electrical voltages in the range of 24 Volts to 100 Volts.

13. The lift truck as claimed in claim 3, wherein the electrical unit is configured so that it can be supplied with different electrical voltages.

14. A method of changing a battery block of an industrial truck, comprising:
    positioning a lift truck adjacent an industrial truck having a battery to be changed, the lift truck having an electrical unit comprising at least one of a drive motor and a lifting motor;
    connecting the lift truck electrical unit to the battery to be changed in the industrial truck such that the battery to be changed supplies electrical energy to the lift truck electrical unit; and
    actuating the lift truck to remove the battery from the industrial truck using electrical power from the industrial truck battery being changed.

* * * * *